US009958220B2

(12) United States Patent
Kim

(10) Patent No.: US 9,958,220 B2
(45) Date of Patent: May 1, 2018

(54) DEBRIS FILTRATION APPARATUS

(71) Applicant: DOOSAN HEAVY INDUSTRIES & CONSTRUCTION CO., LTD., Changwon-si, Gyeongsangnam-do (KR)

(72) Inventor: Ki Youl Kim, Changwon-si (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 238 days.

(21) Appl. No.: 14/971,202

(22) Filed: Dec. 16, 2015

(65) Prior Publication Data

US 2016/0178294 A1 Jun. 23, 2016

(30) Foreign Application Priority Data

Dec. 17, 2014 (KR) .................. 10-2014-0182635

(51) Int. Cl.
*F28F 19/01* (2006.01)
*B01D 29/60* (2006.01)
(Continued)

(52) U.S. Cl.
CPC .............. *F28F 19/01* (2013.01); *B01D 29/52* (2013.01); *B01D 29/606* (2013.01); *B01D 29/96* (2013.01);
(Continued)

(58) Field of Classification Search
CPC ...... B01D 29/52; B01D 29/606; B01D 29/96; B01D 33/15; B01D 33/19; B01D 35/02;
(Continued)

(56) References Cited

U.S. PATENT DOCUMENTS 3,483,980 A * 12/1969 Cochran .............. G21C 19/313
210/131
4,814,076 A * 3/1989 Jackson .................. B01D 33/15
210/158
(Continued)

FOREIGN PATENT DOCUMENTS

DE  9309126 U1  6/1993
EP  2719435 A1  4/2014
(Continued)

OTHER PUBLICATIONS

Communication dated Jun. 3, 2016 issued by the European Patent Office in counterpart application No. 15200691.2.

*Primary Examiner* — Terry K Cecil
(74) *Attorney, Agent, or Firm* — Sughrue Mion, PLLC

(57) ABSTRACT

A debris filtration apparatus that includes a support unit including first to n-th unit supports arranged in a radial shape in a circumferential direction around a support housing disposed on an upper portion of a rotor unit configured to rotate at a predetermined speed in a chamber housing; a screen unit including first to n-th unit screens disposed between the first to n-th unit supports and configured to filter out debris from cooling water; and a bypass unit configured, when a load applied to the screen unit is increased to a predetermined level by debris deposited on the screen unit, to selectively rotate each of the first to n-th unit screens relative to the support unit and allow the cooling water to flow.

19 Claims, 12 Drawing Sheets

(51) Int. Cl.
  *B01D 29/96*     (2006.01)
  *B01D 33/15*     (2006.01)
  *B01D 33/19*     (2006.01)
  *B01D 35/02*     (2006.01)
  *B01D 35/147*    (2006.01)
  *B01D 29/52*     (2006.01)
  *G21C 19/307*    (2006.01)
  *G21D 1/00*      (2006.01)
  *F22B 37/48*     (2006.01)

(52) U.S. Cl.
  CPC .............. *B01D 33/15* (2013.01); *B01D 33/19* (2013.01); *B01D 35/02* (2013.01); *B01D 35/147* (2013.01); *F22B 37/48* (2013.01); *G21C 19/307* (2013.01); *G21D 1/006* (2013.01); *Y02E 30/40* (2013.01)

(58) Field of Classification Search
  CPC ........ B01D 35/147; F22B 37/48; F28F 19/01; G21C 19/307; G21D 1/006; Y02E 30/40
  See application file for complete search history.

(56) References Cited

U.S. PATENT DOCUMENTS

| | | |
|---|---|---|
| 4,904,397 A | 2/1990 | Eimer et al. |
| 8,501,012 B2 | 8/2013 | Himmel |

FOREIGN PATENT DOCUMENTS

| | | |
|---|---|---|
| KR | 10-1988-0005955 B1 | 7/1988 |
| KR | 10-2011-0015398 B1 | 2/2011 |

\* cited by examiner

DEBRIS FILTRATION APPARATUS

CROSS-REFERENCE TO RELATED APPLICATION(S)

This application claims priority to Korean Patent Application No. 10-2014-0182635 filed on Dec. 17, 2014 the disclosure of which is incorporated herein by reference in its entirety

BACKGROUND

Field of the Invention

Exemplary embodiments of the present disclosure relates to a debris filtration apparatus which filters out debris from cooling water to be supplied to a target structure, which is required to be cooled by the cooling water, whereby the target structure can be reliably cooled, and which is configured such that debris deposited on a screen unit can be reliably removed, and even when a large amount of debris is deposited on the screen unit, cooling water can be supplied to the target structure so as to ensure stable cooling operation.

Description of the Related Art

Generally, thermoelectric power plants or nuclear power plants are equipped with apparatuses such as a heat exchanger and a condenser. A pipe unit having a hollow structure is coupled to the heat exchanger or condenser.

Cooling water is supplied to the heat exchanger or condenser through the pipe unit. Because various kinds of debris may be deposited in the pipe unit and debris may be contained in cooling water, a separate debris removal unit (not shown) is used to remove such debris from cooling water such that only cooling water can be supplied to the heat exchanger or condenser to which the pipe unit is coupled.

In the conventional techniques, a debris filtration apparatus has been used to filter out debris from cooling water before the cooling water is supplied to a heat exchanger or condenser. However, there are problems in that if a large amount of debris is deposited in the debris filtration apparatus, the debris filtration apparatus may be disabled or cooling water may not be supplied to the heat exchanger or condenser.

For example, if cooling water cannot be supplied to a condenser installed in a thermoelectric power plant, the operation of the thermoelectric power plant may be partially disabled or the operation of peripheral apparatuses connected to the condenser may be interrupted, thus making power generation impossible. Given this, it is very important to stably and reliably supply cooling water to the condenser.

Therefore, a method of bypassing cooling water to the condenser when a large amount of debris is deposited in the filtration apparatus is required.

Patent Document

U.S. Pat. No. 4,904,397

SUMMARY

An object of the present disclosure is to provide a debris filtration apparatus which makes it possible to reliably supply cooling water to a heat exchange target structure equipped in various kinds of power plants and is configured such that when bypass operation is required because of a large amount of debris deposited in the debris filtration apparatus, the bypass operation can be easily embodied, thus promoting the stable operation of the target structure and a power plant equipped with the target structure.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a debris filtration apparatus includes: a support unit including first to n-th unit supports arranged, to form a radial shape, in a circumferential direction around a support housing disposed on an upper portion of a rotor unit, the rotor unit being configured to rotate at a predetermined speed in a chamber housing; a screen unit including first to n-th unit screens disposed between the first to n-th unit supports and configured to filter out debris from cooling water; and a bypass unit configured, when a load applied to the screen unit is increased to a predetermined level by debris deposited on the screen unit, to selectively rotate each of the first to n-th unit screens relative to the support unit and allow the cooling water to flow.

In the debris filtration apparatus in accordance with an aspect of the present disclosure, the bypass unit may be configured such that: a first end of each of the first to n-th unit screens is rotatably coupled to the support housing by a hinge, and a second end thereof is connected to the chamber housing by a connector; and when a load is increased to the predetermined level by debris deposited on the screen unit, the connector is broken.

In the debris filtration apparatus in accordance with another aspect of the present disclosure, the connector may extend from an outside of the chamber housing toward the corresponding one of the first to n-th unit screens.

In the debris filtration apparatus in accordance with another aspect of the present disclosure, the connector may include a reduced-diameter part formed such that a diameter thereof is reduced from opposite ends thereof to a medial portion with respect to a longitudinal direction of the connector.

In the debris filtration apparatus in accordance with another aspect of the present disclosure, the first to n-th unit screens may be oriented in a horizontal direction between the first to n-th unit supports, and each of the first to n-th unit screens may be configured such that an outer end thereof that faces the chamber housing is rotatable around the corresponding hinge toward the support housing.

In the debris filtration apparatus in accordance with another aspect of the present disclosure, the bypass unit may include: first to n-th unit cylinders disposed outside the chamber housing toward the respective first to n-th unit screens; and first to n-th unit pistons configured to move forward from the respective first to n-th unit cylinders toward corresponding insert holes formed in the first to n-th unit screens or move backward away from the insert holes.

In the debris filtration apparatus in accordance with another aspect of the present disclosure, the bypass unit may include: a rotating shaft connected at one end thereof to a frame provided on the first to n-th unit screens; and a motor unit configured to selectively rotate the rotating shaft.

In the debris filtration apparatus in accordance with another aspect of the present disclosure, the motor unit may be configured to rotate the rotating shaft connected to at least one or multiple ones of the first to n-th unit screens.

The debris filtration apparatus in accordance with another aspect of the present disclosure may further include a differential pressure sensor installed in the chamber housing and configured to measure a pressure of the cooling water that passes through the screen unit.

In the debris filtration apparatus in accordance with another aspect of the present disclosure, the differential pressure sensor may include: a first sensor disposed below the screen unit and configured to measure a pressure of the cooling water that is in a state before passing through the screen unit; and a second sensor disposed over the screen unit and configured to measure a pressure of the cooling water that has passed through the screen unit.

In the debris filtration apparatus in accordance with another aspect of the present disclosure, the differential pressure sensor may include a plurality of differential pressure sensors disposed in the chamber housing at positions spaced apart from each other at regular intervals in a circumferential direction.

In the debris filtration apparatus in accordance with another aspect of the present disclosure, each of the first to n-th unit screens may protrude in a polygonal shape upward between corresponding ones of the first to n-th unit supports.

In the debris filtration apparatus in accordance with another aspect of the present disclosure, each of the first to n-th unit screens may include: a protrusion part protruding from a central portion of an upper surface of the unit screen between corresponding ones of the first to n-th unit supports; and an extension part extending in a dome shape downward from each of left and right lower edges of the protrusion part.

In the debris filtration apparatus in accordance with another aspect of the present disclosure, the first to n-th unit screens may be formed in a dome shape from a circumference defined by outer ends of the first to n-th unit supports toward the support housing.

In accordance with yet another aspect of the present disclosure, a debris filtration apparatus includes: a support unit including first to n-th unit supports arranged, to form a radial shape, in a circumferential direction around a support housing disposed on an upper portion of a rotor unit, the rotor unit being configured to rotate at a predetermined speed in a chamber housing; a screen unit including first to n-th unit screens disposed between the first to n-th unit supports and configured to filter out debris from cooling water; and a bypass unit configured, when a load applied to the screen unit is increased to a predetermined level by debris deposited on the screen unit, to move each of the first to n-th unit screens toward an upper portion of the support housing and form a space for allowing the cooling water to flow therethrough.

In the debris filtration apparatus in accordance with an aspect of the present disclosure, the bypass unit may include: a guide bar extending upward from the support housing, with an O-ring fitted over the guide bar; a cylindrical movable body provided around the guide bar; a connection plate having a first end fixed to the cylindrical movable body, and a second end divided toward the respective first to n-th unit screens and connected to the first to n-th unit screens; and a connector inserted into the cylindrical movable body from an outside of the cylindrical movable body toward the guide bar and configured to be broken when a load applied to the screen unit is increased to the predetermined level by debris deposited on the screen unit.

In the debris filtration apparatus in accordance with another aspect of the present disclosure, the connector may include a reduced-diameter part formed such that a diameter thereof is reduced from opposite ends thereof to a medial portion with respect to a longitudinal direction of the connector.

In the debris filtration apparatus in accordance with another aspect of the present disclosure, the bypass unit may include: a guide bar extending upward from the support housing, with an O-ring fitted over the guide bar; a cylindrical movable body provided around the guide bar; a unit connection plate having a first end fixed to the cylindrical movable body, and a second end divided toward the respective first to n-th unit screens and connected to the first to n-th unit screens; and a motor unit configured to transmit a rotational force to a rotational force transmission part fixed on an outer surface of the cylindrical movable body and selectively move the cylindrical movable body upward or downward.

The debris filtration apparatus in accordance with another aspect of the present disclosure may further include a differential pressure sensor installed in the chamber housing and configured to measure pressures of the cooling water before passing through the screen unit and after having passing through the screen unit.

It is to be understood that both the foregoing general description and the following detailed description of the present disclosure are exemplary and explanatory and are intended to provide further explanation of the invention as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 3 is a view showing the operation of the bypass unit according to the exemplary embodiment of.

DESCRIPTION OF SPECIFIC EMBODIMENTS

Figure 1:
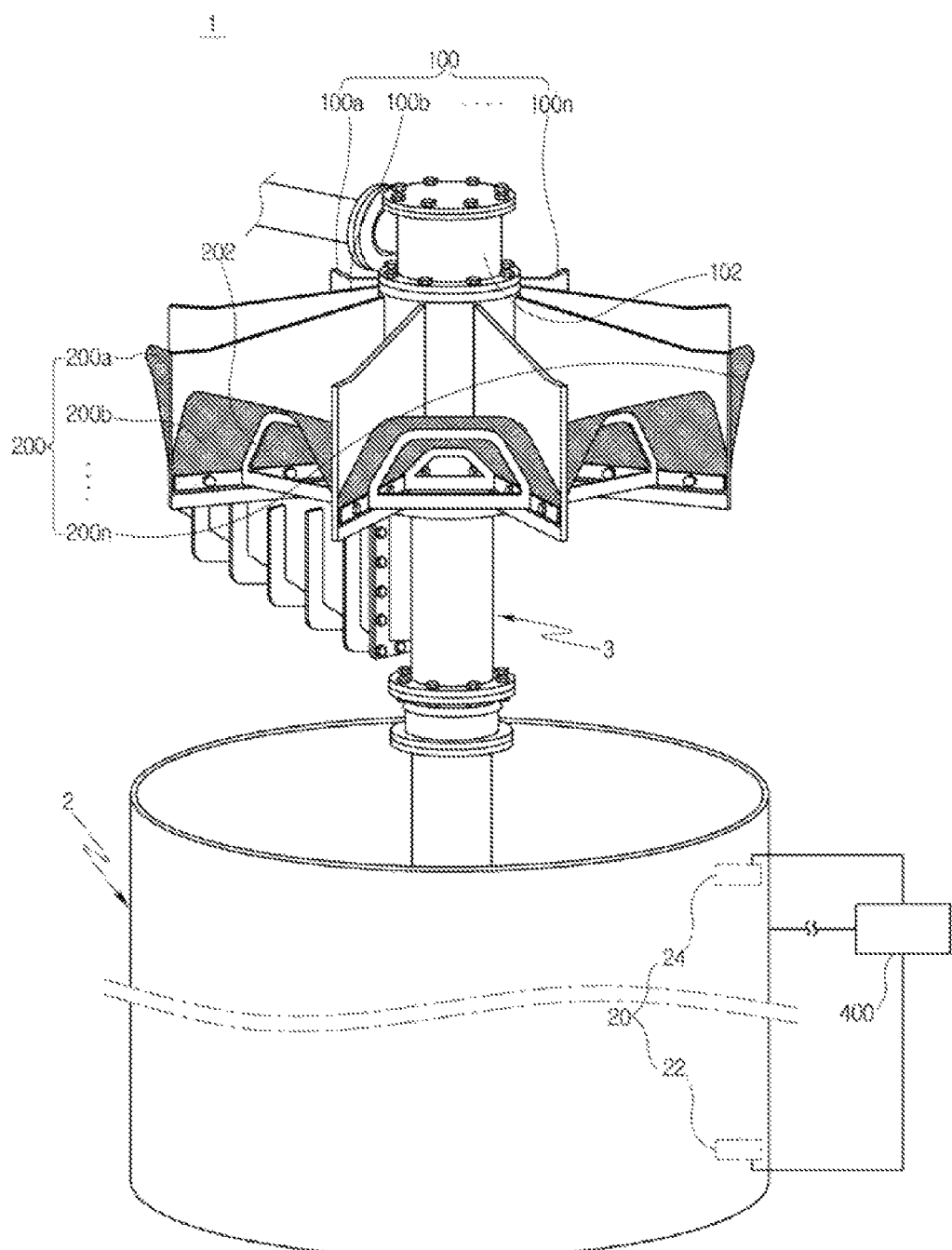
FIG. 1 is a perspective view illustrating a debris filtration apparatus according to an exemplary embodiment.
Figure 2:
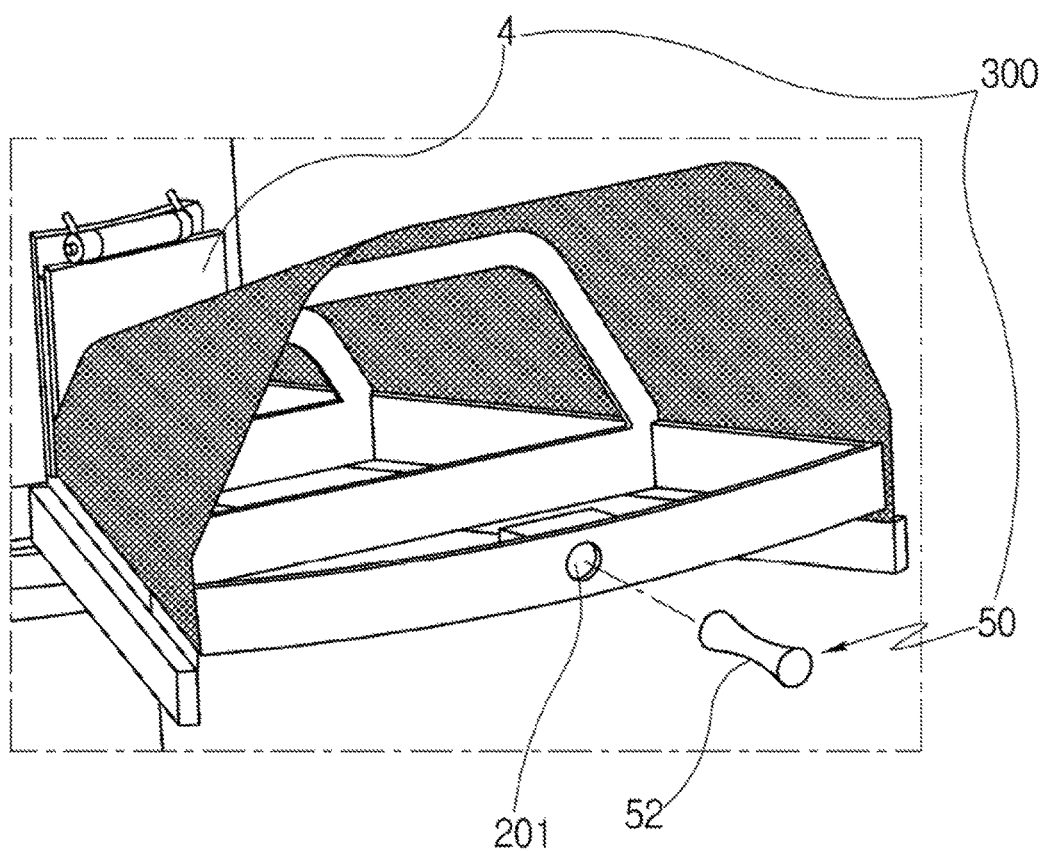
FIG. 2 is a perspective view illustrating an example of a bypass unit according to the exemplary embodiment.
Figure 3:
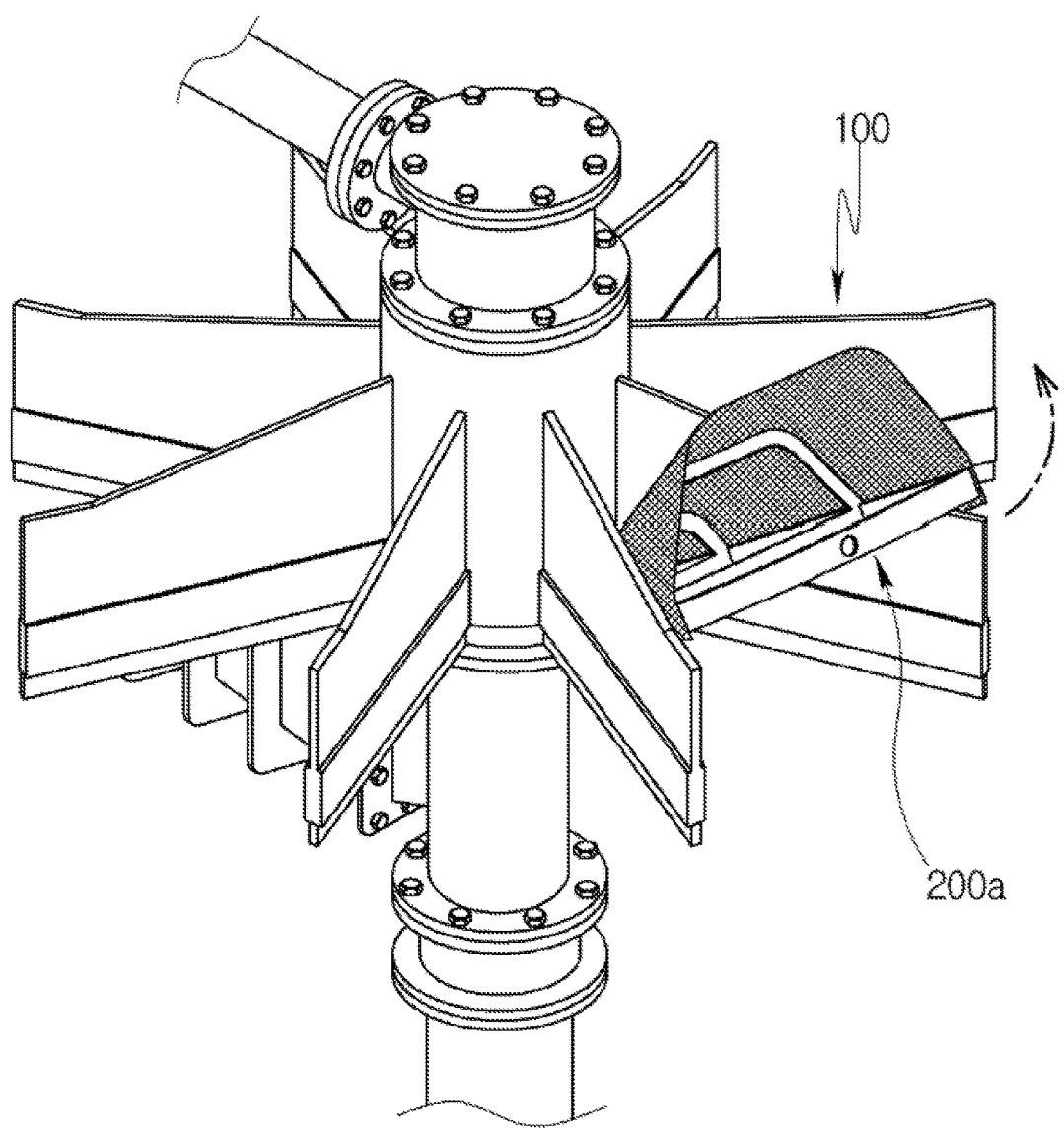

Hereinafter, exemplary embodiments of a debris filtration apparatus according to the present disclosure will be described with reference to the attached drawings. FIG. 1 is a perspective view illustrating a debris filtration apparatus according to an embodiment of the present disclosure. FIG. 2 is a perspective view illustrating an example of a bypass unit according to the embodiment of the present disclosure. FIG. 3 is a view showing the operation of the bypass unit according to the embodiment of the present disclosure.

Referring to FIGS. 1 to 3, the debris filtration apparatus 1 functions to filter out debris from cooling water to be supplied to a target structure required to be cooled, more particularly, to a condenser (not shown) provided in various kinds of power plants (thermoelectric power plants, nuclear power plants, etc.), thus promoting stable operation of the target structure.

To achieve the above-mentioned purpose, the debris filtration apparatus 1 according to the present embodiment includes a support unit 100 which is disposed in a chamber housing 2, a screen unit 200 which is disposed between parts of the support unit 100, and a bypass unit 300 which makes cooling water forcibly flow through the debris filtration apparatus 1 when a large amount of debris is deposited on the screen unit 200.

The chamber housing 2 has a cylindrical shape with a predetermined diameter, in which the support unit 100 is installed. The support unit 100 is disposed over the rotor unit 3.

The rotor unit 3 receives rotational force from a motor (not shown) for rotation and rotates inside the chamber housing 2 at predetermined speed. The structure of the rotor unit 3 is as shown in the drawings.

The support unit 100 includes first to n-th unit supports 100a to 100n which are arranged in a radial shape in a circumferential direction around the center of the support housing 102 disposed on the upper portion of the rotor unit 3. The first to n-th unit supports 100a to 100n are spaced apart from each other at the same intervals so that opposite ends of the screen unit 200, which will be described later herein, can be supported by the corresponding unit supports 100a to 100n.

Each of the first to n-th unit supports 100a to 100n has a plate shape and is fixed at a first end thereof to the support housing 102 and oriented in a radial direction such that a second end thereof faces the circumference of the chamber housing 2, as shown in the drawings.

The screen unit 200 includes first to n-th unit screens 200a to 200n each of which is individually installed between corresponding ones between the first to n-th unit supports 100a to 100n so as to filter out debris from cooling water.

A wire net having a specific mesh size to filter out debris from cooling water is used as each of the first to n-th unit screens 200a to 200n. A plurality of support frames 202 making close contact with the wire net are longitudinally installed under the wire net. For reference, each of the first to n-th unit screens 200a to 200n protrudes upwards in a polygonal shape between corresponding ones of the first to n-th unit supports 100a to 100n.

As such, in the case where each of the first to n-th unit screens 200a to 200n is formed to have a polygonal shape, the area with which the unit screen can filter out debris is increased so that a debris removal rate can be increased, whereby the efficiency of the debris filtration apparatus 1 can be enhanced.

The bypass unit 300 is installed on each of the first to n-th unit screens 200a to 200n. When a large amount of debris deposed on the screen unit 200 blocks cooling water from smoothly passing through the screen unit 200 and thus excessively increases a load, the bypass unit 300 selectively rotates the associated one of the first to n-th unit screens 200a to 200n and allows cooling water to flow through the debris filtration apparatus 1. For example, if cooling water cannot be supplied to a condenser installed in a thermoelectric power plant or a load is excessively increased by a large amount of debris deposed on the screen unit 200, the operation of the thermoelectric power plant may have to be interrupted.

With regard to the debris filtration apparatus 1, if the bypass unit 300 is operated, cooling water containing debris is supplied to the condenser, so that the cooling efficiency may be reduced, but the operation of the thermoelectric power plant can be continued. Given this, as needed, the debris filtration apparatus 1 operates the bypass unit 300 and thus forcibly rotates the first to n-th unit screens 200a to 200n upward relative to the rotor unit 3, thus ensuring the stable operation of the thermoelectric power plant.

In this way, the present embodiment ensures supply of cooling water even when a large amount of debris is contained in cooling water or even in case of emergency, thus promoting stable power generation.

The bypass unit 300 according to an embodiment of the present disclosure is configured such that when a load of a predetermined pressure or more is applied to the screen unit 200 by a large amount of debris deposed on the screen unit 200, a connector 50 is broken so that any one, multiple ones or all of the first to n-th unit screens 200a to 200n that have been fixed are released and rotated in a direction in which cooling water moves, thus allowing a large amount of cooling water to forcibly pass through the debris filtration apparatus. In this way, a bypass operation is embodied.

In more detail, in the bypass unit 300, a first end of each of the first to n-th unit screens is rotatably coupled to the support housing 102 by a hinge 4, and a second end thereof is connected to the chamber housing 2 by a connector 50. The connector 50 has a reduced-diameter part 52 in a predetermined portion with respect to an axial direction so that when a load is increased to a predetermined level by a large amount of debris deposited on the screen unit 200, the connector 50 can be broken.

In the present embodiment, the connector 50 has a pin shape with a predetermined length, but it may be modified to have another shape. That is, the connector 50 can be changed into various forms rather than being limited to that shown in the drawings.

The connector 50 may be installed for each of all of the first to n-th unit screens 200a to 200n or restrictively installed for a specific unit screen. Although the number of connectors is not limited, it is preferable that a cooling water supply rate at which the stable operation of the condenser can be ensured be determined in advance and a required number of connectors be used.

The reduced-diameter part 52 is formed to be reduced in diameter such that it can be broken by a predetermined load or more depending on the material and diameter of the connector 50. The minimum diameter of the reduced-diameter part 52 may vary depending on the material and diameter of the connector 50, and the diameter and material of the connector 50 are not limited to specific diameter and material.

The hinge 4 is fixed at a first end thereof to the support housing 102, and a second end thereof is fixed to the corresponding one of the first to n-th unit screen 200a to 200n. The hinge 4 does not necessarily have the structure shown in the drawings but can also have various other structures.

The connector 50 extends from the outside of the chamber housing 2 toward the corresponding one of the first to n-th unit screen 200a to 200n. Since a large amount of cooling water flows through the chamber housing 2, a separate sealing member (not shown) may be provided around the connector 50. The sealing member may be made of either rubber or silicon.

The first to n-th unit screens 200a to 200n are horizontally disposed between the first to n-th unit supports 100a to 100n.

Each of the first to n-th unit screens 200a to 200n is configured such that an outer end thereof facing the chamber housing 2 can be rotated around the hinge 4 toward the support housing 102, as designated by the arrow. When the unit screen 200 is rotated toward the support housing 102, the space in which the unit screen 200 has been horizontally disposed between the corresponding ones of the first to n-th unit supports 100a to 100n is opened to allow a large amount of cooling water to flow via the screen unit 200.

A bypass unit according to another embodiment of the present disclosure will be described with reference to the associated drawings.

Figure 4:
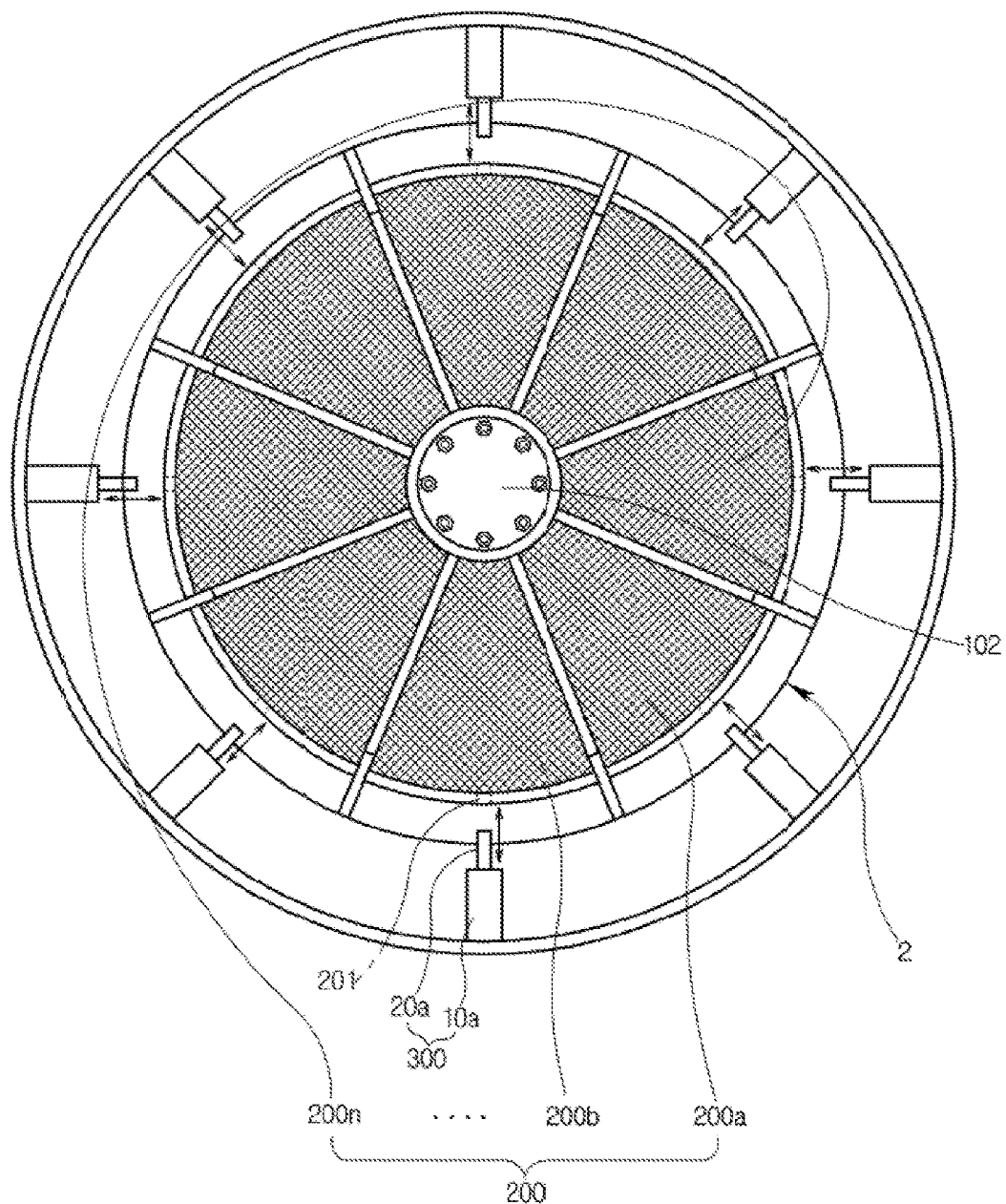
FIG. 4 is a perspective view illustrating a bypass unit according to another exemplary embodiment.

Referring to FIG. 1 or 4, unlike the above-mentioned bypass unit that bypasses the flow of cooling water using the connector 50, the bypass unit 300 according to the present embodiment is connected to the control unit 400 so that the flow rate of cooling water passing through the screen unit 200 of the chamber housing 2 can be controlled. For example, a configuration using a cylinder and a piston may be used.

In more detail, the bypass unit 300 includes first to n-th unit cylinders 10a to 10n which are disposed outside the chamber housing 2 toward the respective first to n-th unit screens 200a to 200n, and first to n-th unit pistons 20a to 20n which are configured to move forward from the respective first to n-th unit cylinders 10a to 10n toward corresponding insert holes 201 formed in the first to n-th unit screens 200a to 200n or move backward away from the insert holes 201. For reference, the bypass unit 300 may include a separate fixing member (not shown) for fixing the bypass unit 300 to the chamber housing 2.

The critical technical characteristics of the present embodiment are that the operation of bypassing cooling water using the first to n-th unit screens 200a to 200n can be easily embodied even without interrupting the operation of the foreign filtration apparatus 1.

The first to n-th unit cylinders 10a to 10n are arranged in the circumferential direction on the chamber housing 2 in such a way that the first to n-th unit cylinders 10a to 10n face the respective first to n-th unit screens 200a to 200n that are disposed to have a radial shape in the chamber housing 2. The first to n-th unit cylinders 10a to 10n are operated by hydraulic, pneumatic, or another type drive source. The diameter and shape of each cylinder 10 are not limited.

A differential pressure sensor 20 is installed in the chamber housing 2 to measure pressures of cooling water passing through the screen unit 200. The differential pressure sensor 20 is configured to transmit a sensing signal to the control unit 400.

The differential pressure sensor 20 is disposed inside the chamber housing 2. In more detail, the differential pressure sensor 20 includes a first sensor 22 which is disposed below the screen unit 200 and configured to measure the pressure of cooling water before passing through the screen unit 200, and a second sensor 24 which is disposed over the screen unit 200 and configured to measure the pressure of the cooling water that has passed through the screen unit 200.

The first sensor 22 measures the pressure of cooling water before reaching the screen unit 200 and transmits a measured value to the control unit 400. The control unit 400 receives the measured value and determines whether the pressure of the cooling water before passing through the screen unit 200 is within a range of normal conditions.

The control unit 400 uses a cooling water pressure range set during an initial design process as a reference for determining whether the pressure of cooling water is within the range of normal conditions.

Furthermore, the control unit 400 receives a pressure signal measured by the second sensor 24 and determines the pressure of cooling water that has passed through the screen unit 200. If cooling water passing through the screen unit 200 contains a large amount of debris, the amount of debris deposited on the screen 200 is gradually increased over time, thus acting as a factor of varying the pressure of cooling water.

For example, pieces of debris having different sizes are present in cooling water. Such pieces of debris are filtered out while passing through the screen unit 200. Cooling water containing only a minimized amount of debris is supplied to the condenser (not shown).

As the time of use of the screen unit 200 increases, the amount of debris deposed on the first to n-th unit screens 200a to 200n is gradually increased. Therefore, a difference between the pressure of cooling water measured by the second sensor 24 after passing through the screen unit 200 and the pressure of cooling water measured by the first sensor 22 is also increased.

The control unit 400 receives the pressures measured by the first and second sensors 22 and 24, calculates a difference between the pressures, and determines whether current pressure conditions are within the range of normal conditions or abnormal conditions.

For instance, the abnormal conditions refer to the case where a difference between pressures measured by the first and second sensors 22 and 24 is beyond a preset reference range. This case means that a large amount of debris has been deposed on the screen unit 200.

In response to a sensing signal input from the differential pressure sensor 20, the control unit 400 controls the bypass unit 300 such that the first to n-th unit pistons 20a to 20n move forward or backward. With regard to the displacement of the first to n-th pistons 20a to 20n, signals sensed by the first and second sensors 22 and 24 are converted into current signals, and the forward or rearward displacement of each of the first to n-th unit pistons 20a to 20n is determined depending on the current signals.

Each of the first to n-th unit pistons 20a to 20n is inserted at a front end thereof into the corresponding insert hole 201 by a control command of the control unit 400 so that the associated one of the first to n-th unit screens 200a to 200n is maintained in a horizontal state. This refers to the initial state of each unit piston 20.

In response to a sensing signal input from the differential pressure sensor 20, when the control unit 400 transmits a control signal to each of the first to n-th unit cylinders 10a to 10n such that the corresponding one of the first to n-th unit pistons 20a to 20n is moved backward toward the outside of the chamber housing 2, the unit cylinder 10 moves the corresponding unit piston 20 backward away from the insert hole (201, refer to FIG. 2) of the associated one of the first to n-th unit screens 200a to 200n. Then, the associated one of the first to n-th unit screens 200a to 200n is rotated in a direction in which cooling water flows. In this way, bypass for cooling water is made.

If a difference between pressures measured by the first and second sensors 22 and 24 is within the range of normal conditions, the control unit 400 determines that the amount of debris deposited on the screen unit 200 is comparatively small, and thus controls the first to n-th pistons 20a to 20n such that they are maintained at the initial positions thereof.

Depending on a signal input from the differential pressure sensor 20, the control unit 400 may rotate all of the first to n-th unit screens 200a to 200n or any one or multiple ones of the first to n-th unit screens 200a to 200n. In this way, a rate at which cooling water is supplied to the condenser can be more efficiently controlled.

For this, in the present embodiment, differential pressure sensors 20 may be arranged on an inner circumferential surface of the chamber housing 2 at positions spaced apart from each other at regular intervals in the circumferential direction. In this case, the differential pressure sensors 20 may be disposed at positions facing the respective first to n-th unit screens 200a to 200n.

In the case where the differential pressure sensors 20 are disposed at positions facing the respective first to n-th unit screens 200a to 200n, the control unit 400 can measure the pressures of cooling water passing through each of the first to n-th unit screens 200a to 200n.

For example, in the case where any one of the differential pressure sensors is disposed at a position facing the first unit screen 200a and another one of the different pressure sensors is disposed at a position facing the n-th unit screen 200n, pressures of cooling water before and after passing through the first unit screen 200a are measured and transmitted to the control unit 400, and pressures of cooling water before and after passing through the n-th unit screen 200n are measured and transmitted to the control unit 400.

The control unit 400 may receive different input signals depending on the amounts of debris deposited on the respective first to n-th unit screens 200a to 200n. After calculating the signals input from the plurality of differential pressure sensors 20, the control unit 400 can individually control the first to n-th unit screens 200a to 200n.

Therefore, depending on the pressure of cooling water, all of the first to n-th unit screens 200a to 200n according to the present embodiment may be rotated, or some of them may be individually rotated. As such, controlling the first to n-th unit screens 200a to 200n depending on variation in pressure of cooling water can be further facilitated.

A bypass unit according to yet another embodiment of the present disclosure will be described with reference to the associated drawings.

Figure 5:
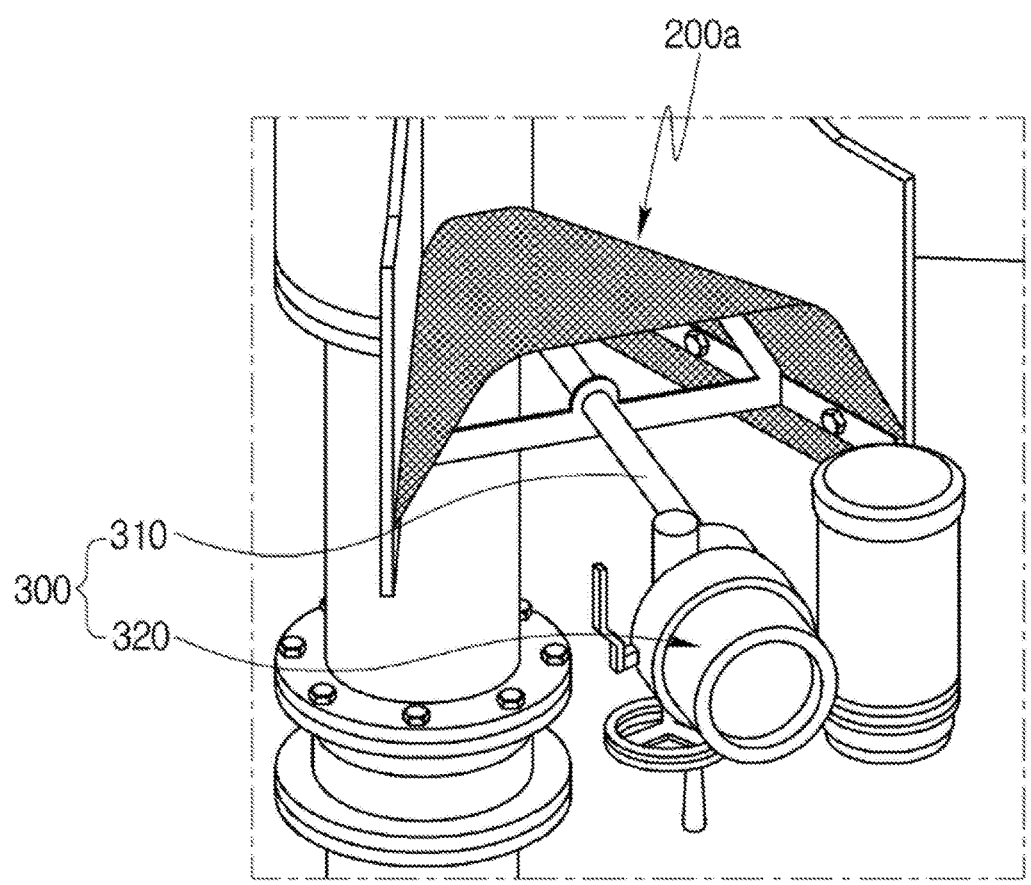
FIGS. 5 and 6 are views showing the operation of a bypass unit according to another exemplary embodiment.
Figure 6:
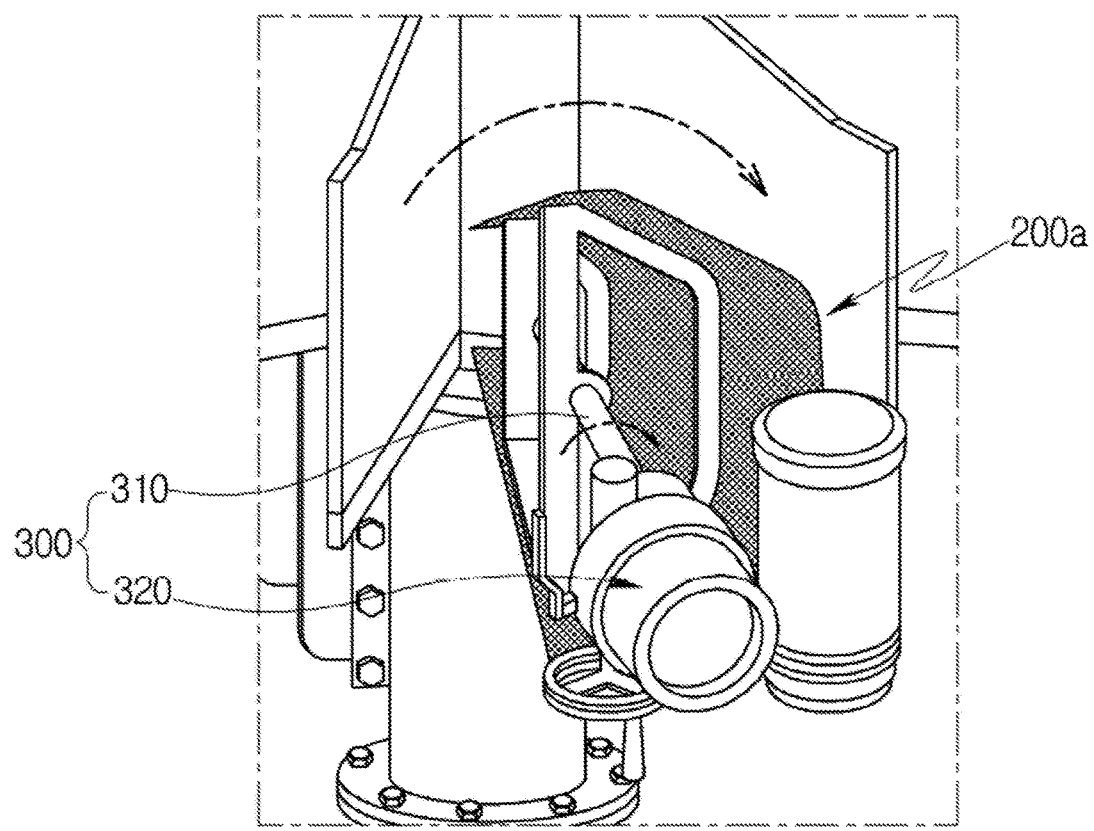

Referring to FIGS. 5 and 6, the bypass unit 300 according to the present embodiment includes a rotating shaft 310 which is connected to a support frame 202 provided on any one or multiple ones of the first to n-th unit screens 200a to 200n, and a motor unit 320 which provides rotational force to rotate the rotating shaft 310 and thus bypass cooling water.

Unlike the above-mentioned breaking type bypass unit using the connector 50, the bypass unit 300 according to the present embodiment can be embodied by merely converting the rotation direction of the rotating shaft 310 without requiring the interruption of the operation of the debris filtration apparatus 1. Therefore, the efficiency of the debris filtration apparatus 1 can be enhanced, and the amount of work imposed on workers to maintain the debris filtration apparatus 1 can be reduced.

The bypass unit 300 is configured such that the motor unit 320 is controlled, interlocking with the differential pressure sensor 20, by the control unit 400. Depending on the angle to which the rotating shaft 310 is rotated, the rate at which cooling water is supplied to the condenser can be controlled. Therefore, cooling water can be supplied to the condenser at the optimum flow rate at which the condenser can be stably operated. For example, in the case of a thermoelectric power plant, the debris filtration apparatus according to the present embodiment can promote stable power generation of the power plant and can fundamentally prevent failure or breakage of the condenser, thus assisting expensive equipment such as the thermoelectric power plant to be efficiently managed.

The rotating shaft 310 extends to the support housing 102 via the support frame 202. The motor unit 320 may comprise a plurality of motor units. The motor units 320 are disposed outside the chamber housing 2, so that problems such as a short circuit or corrosion attributable to cooling water can be prevented. Thus, the motor units 320 can be used for a long period of time without particular malfunction, and there is little need for repair work.

The first to n-th unit screens according to the present disclosure can be embodied in various forms, and this will be explained with reference to the drawings.

Figure 7:
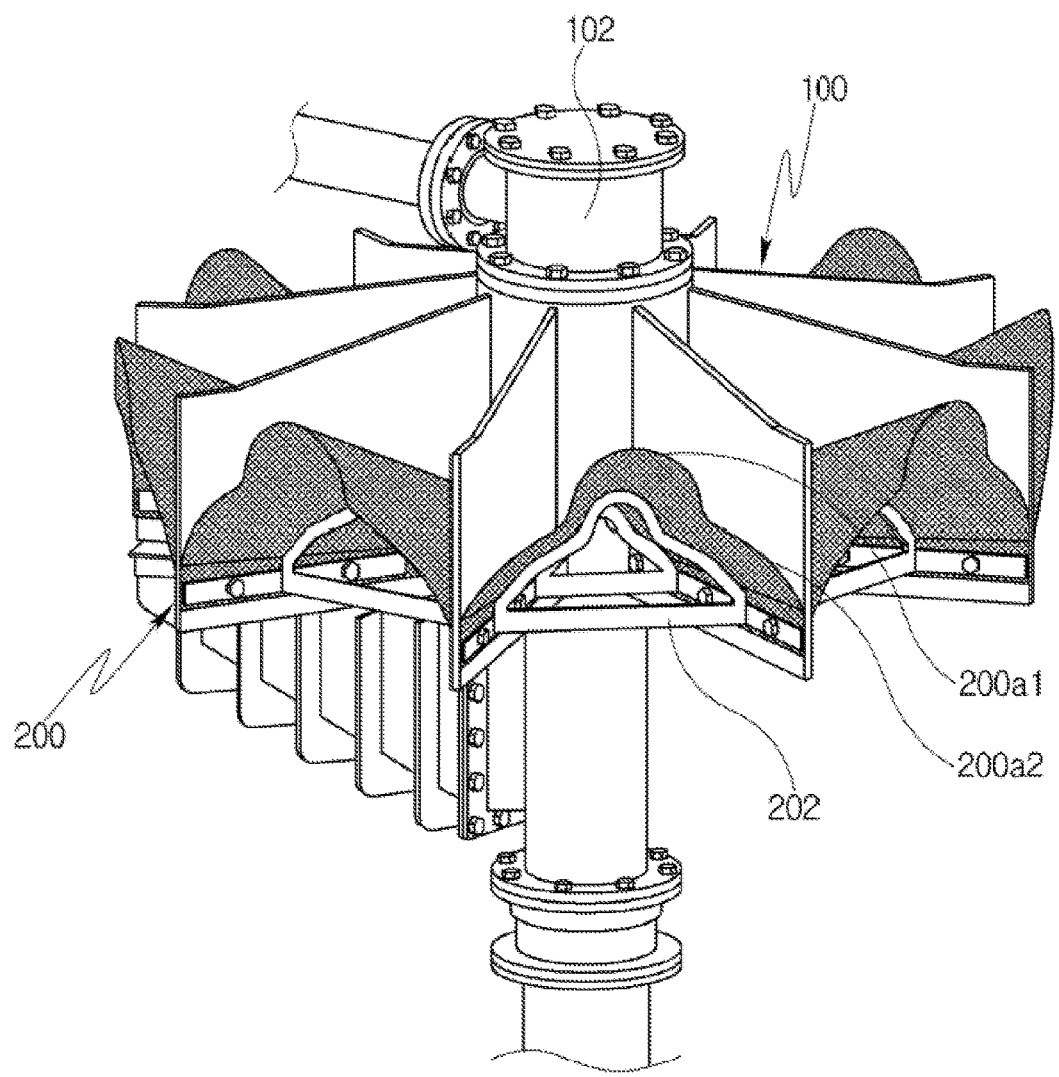
FIGS. 7 and 8 are perspective views showing various embodiments of a screen.

Referring to FIG. 1 or 7, each of the first to n-th unit screens 200a to 200n according to an embodiment of the present disclosure includes a protrusion part 200a1 which protrudes from a central portion of an upper surface of the unit screen between corresponding ones of the first to n-th unit supports 100a to 100n, and an extension part 200a2 which extends in a dome shape downward from each of left and right lower edges of the protrusion part 200a1. The extension part 200a2 is inclined downward from an outer end thereof facing the chamber housing 2 to an inner end thereof facing the support housing 102.

The protrusion part 200a1 protrudes upwards in such a way that a height to which it protrudes toward the chamber housing 2 is greater than a height to which it protrudes toward the support housing 102. The support frames 202 that come into close contact with the protrusion part 200a1 are configured such that the sizes thereof are reduced, in proportion to the size of the unit screen, from the chamber housing 2 toward the support housing 102.

Therefore, the flow of cooling water passing through the first to n-th supports 100a to 100n can be induced into turbulent flow rather than steady flow.

The protrusion part 200a1 changes the flow of cooling water into a vortex form, thus making removal of debris from cooling water more effective. Hence, the amount of debris deposited on the first to n-th unit screens 200a to 200n can be minimized, whereby an unnecessary load applied to the debris filtration apparatus 1 can be minimized. As a result, the durability of the elements of the debris filtration apparatus 1 can be enhanced, and the malfunctioning rate of the debris filtration apparatus 1 can be reduced.

Figure 8:
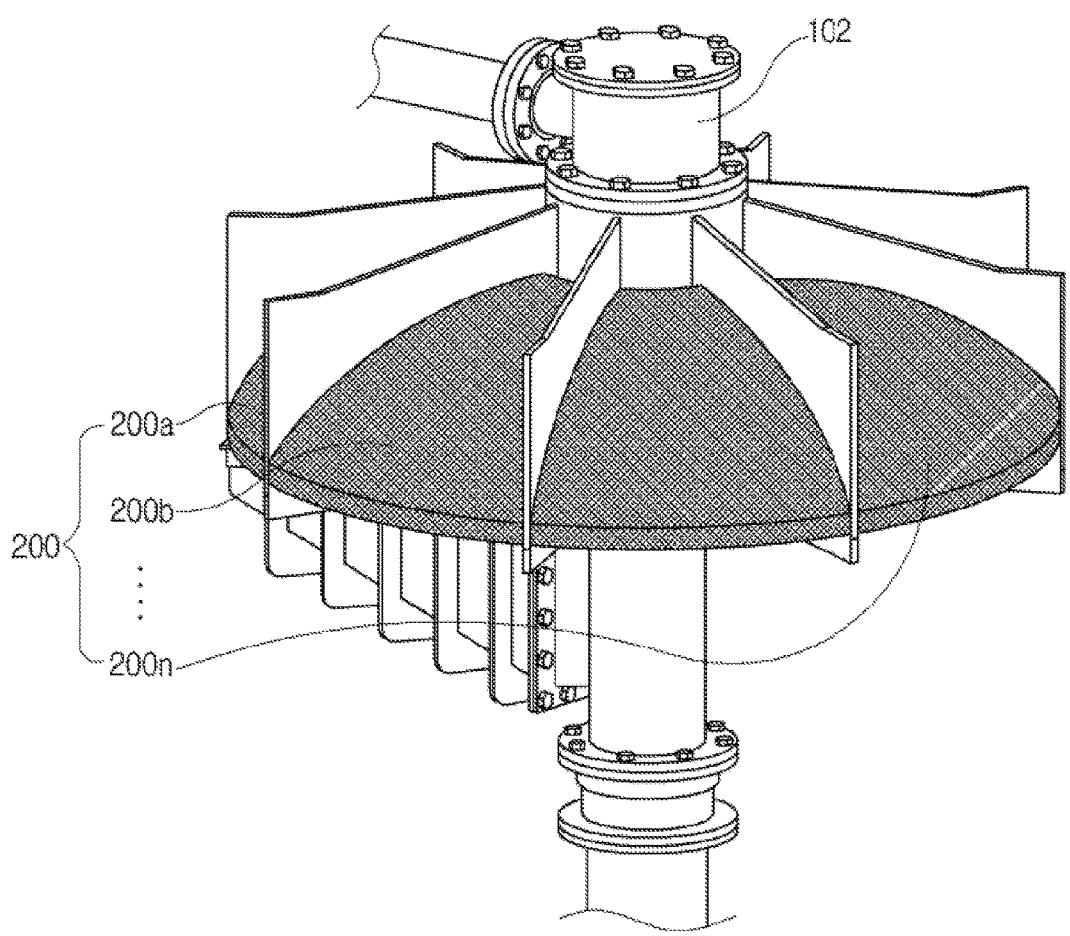

Referring to FIG. 8, the first to n-th unit screens 200a to 200n are formed in a dome shape from the circumference defined by outer ends of the first to n-th unit supports 100a to 100n toward the support housing 102. As such, in the case where the first to n-th unit screens 200a to 200n have a dome shape, the area with which the unit screen can filter out debris from cooling water is increased so that a debris removal rate can be increased, whereby the efficiency of the debris filtration apparatus 1 can be improved, and the amount of unnecessary debris supplied to the condenser can be minimized.

Although an angle of the inclination of the first to n-th unit screen 200a to 200n is not limited to a special value, it is preferable that they are formed in a dome shape illustrated in the drawing for the sake of manufacturing.

A debris filtration apparatus according to another embodiment of the present disclosure will be described with reference to the associated drawings.

Figure 9:
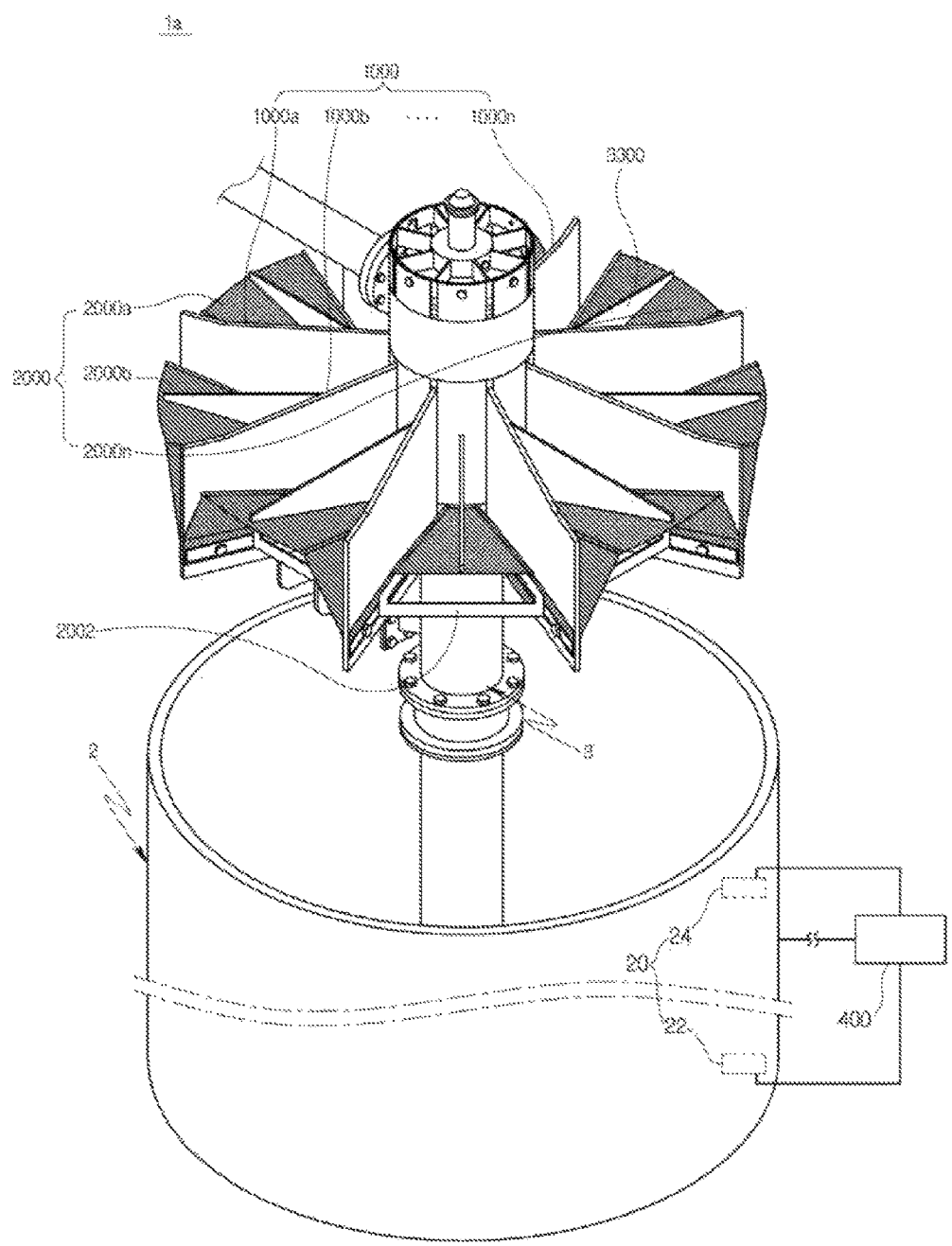
FIG. 9 is a perspective view illustrating a debris filtration apparatus according to yet another exemplary embodiment.
Figure 10:
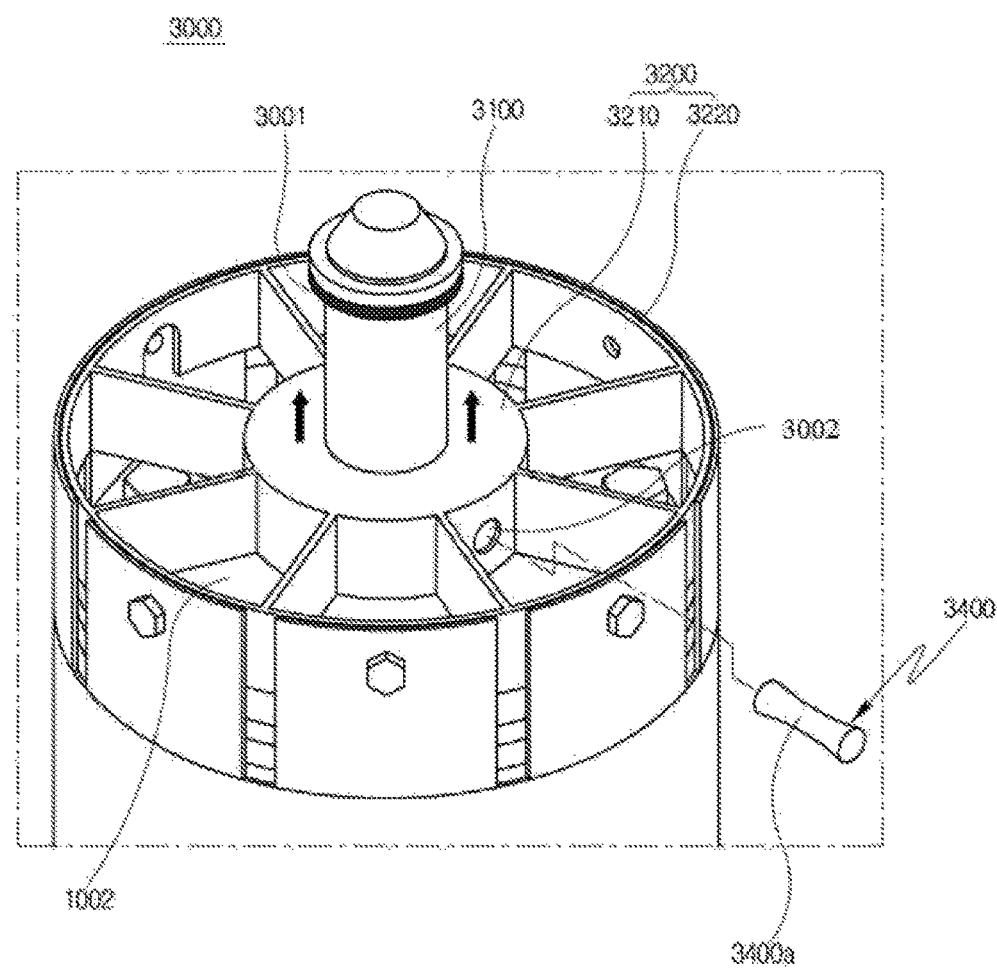
FIGS. 10 and 11 is a perspective view illustrating the debris filtration apparatus according to the exemplary embodiment of FIG. 9.

Referring to FIGS. 9 and 10, the debris filtration apparatus 1a according to the present embodiment is used to filter out debris from cooling water when the cooling water is supplied to a condenser provided in a thermoelectric power plant.

To achieve the above-mentioned purpose, the debris filtration apparatus according to the present apparatus includes a support unit 1000, a screen unit 2000, and a bypass unit 3000. The support unit 1000 includes first to n-th unit supports 1000a to 1000n which are arranged, to form a radial shape, in a circumferential direction around a support housing 102 disposed on an upper portion of a rotor unit 3. The rotor unit 3 is configured to rotate at a predetermined speed in a chamber housing 2. The screen unit 2000 includes first to n-th unit screens 2000a to 2000n which are disposed between the first to n-th unit supports 1000a and 1000n and configured to filter out debris from cooling water. The bypass unit 3000 is configured, when a load applied to the screen unit 2000 is increased to a predetermined level by debris deposited on the screen unit 2000, to move each of the first to n-th unit screens 2000a to 2000n toward an upper portion of the support housing 102 and form space for allowing cooling water to flow therethrough.

The chamber housing 2 has a cylindrical shape with a predetermined diameter, in which the support unit 1000 is installed. The support unit 1000 is disposed over the rotor unit 3.

The rotor unit 3 receives rotational force from a separate motor (not shown) for rotation and rotates inside the chamber housing 2 at predetermined speed. The structure of the rotor unit 3 is as shown in the drawings.

The support unit 1000 includes first to n-th unit supports 1000a to 1000n which are arranged, to form a radial shape, in a circumferential direction around the center of the support housing 102 disposed on the upper portion of the rotor unit 3. The first to n-th unit supports 1000a to 1000n are spaced apart from each other at the same intervals and configured to support the screen unit 2000, which will be described in detail later herein.

Each of the first to n-th unit supports 1000a to 1000n has a plate shape and is fixed at a first end thereof to the support housing 102 and oriented in a radial direction such that a second end thereof faces the circumference of the chamber housing 2, as shown in the drawings.

The screen unit 2000 includes first to n-th unit screens 2000a to 2000n each of which is individually installed between corresponding ones between the first to n-th unit supports 1000a to 1000n so as to filter out debris from cooling water.

A wire net having a specific mesh size to filter out debris from cooling water is used as each of the first to n-th unit screens 2000a to 2000n. A plurality of support frames 2002 are installed under the wire net in the longitudinal direction of the wire net. For reference, each of the first to n-th unit screens 2000a to 2000n protrudes upwards in a polygonal shape between corresponding ones of the first to n-th unit supports 1000a to 1000n.

As such, in the case where each of the first to n-th unit screens 2000a to 2000n is formed to have a polygonal shape, the area with which the unit screen can filter out debris is increased so that a debris removal rate can be increased, whereby the efficiency of the debris filtration apparatus 1 can be improved.

Figure 11:
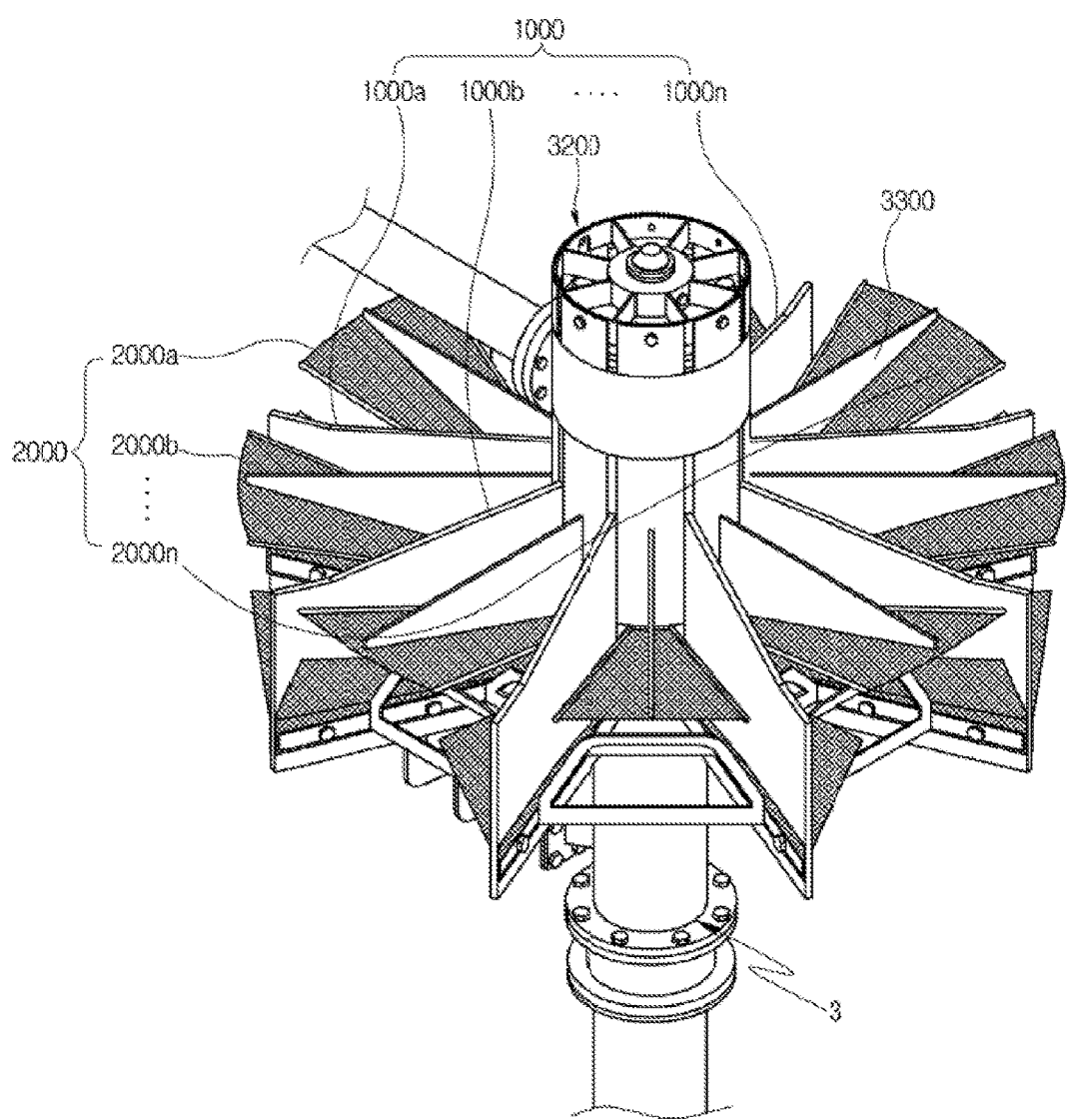

Referring to FIGS. 10 to 11, when cooling water cannot smoothly pass through the screen unit 2000 by a large amount of debris deposited on the screen unit 2000 and a load is thereby increased, the bypass unit 3000 moves the first to n-th unit screens 2000a to 2000n toward the upper portion of the support housing 1002, thus forming additional space through which cooling water can flow.

For example, if the amount of debris contained in cooling water is abnormally increased and thus cooling water cannot be reliably supplied to the condenser, or if a large amount of debris is deposited on the screen unit 2000 and thus a load is excessively increased, the operation of the thermoelectric power plant may be interrupted.

In this case, the bypass unit 3000 is operated to move the first to n-th unit screens 2000a to 2000n upward such that even cooling water containing debris can be supplied to the condenser, thus ensuring the stable operation of the thermoelectric power plant.

In this way, the present embodiment is intended to ensure reliable supply of cooling water when a large amount of debris is contained in cooling water or in case of emergency, thus promoting stable power generation.

The bypass unit 3000 is operated depending on a load applied to a connector 3400. For example, while debris is deposited on the screen unit, pressure by cooling water and pressure resulting from debris deposited on the screen unit are applied together to the connector 3400. Then the connector 3400 is broken instantaneously when the load applied thereto reaches the maximum load that the connector 3400 can withstand.

For this, the bypass unit 3000 includes a guide bar 3100, a cylindrical movable body 3200, a connection plate 3300, and the connector 3400. The guide bar 3100 extends upward from the support housing 1002 with an O-ring 3001 fitted over the guide bar 3100. The cylindrical movable body 3200 is provided around the guide bar 3100. The connection plate has a first end fixed to the cylindrical movable body 3200, and a second end divided toward the respective first to n-th unit screens 2000a to 2000n and connected to the first to n-th unit screens 2000a to 2000n. The connector 3400 is inserted into the cylindrical movable body 3200 from the outside of the cylindrical movable body 3200 toward the guide bar 3100 and configured to be broken when a load applied to the screen unit 2000 is increased to a predetermined level by debris deposited on the screen unit.

The guide bar 3100 has a diameter less than that of the support housing 1002 and extends a predetermined length upward from a central portion of an upper surface of the support housing 1002. The O-ring 3001 is fitted over the guide bar 3100.

The movable body 3200 has a cylindrical shape and is provided around the guide bar 3100. The movable body 3200 extends downward toward the first to n-th unit screens 2000a to 2000n which are separated from each other. Furthermore, the movable body 3200 is coupled to the wire nets forming the upper surfaces of the first to n-th unit screens 2000a to 2000n by the connection plate 3300. Therefore, when the movable body 3200 moves upward in the direction of the arrow, the wire nets are also moved upward along with the movable body 3200, thus forming space through which a large amount of cooling water can flow.

In the case of the present embodiment, since the entirety of the screen unit 2000 is moved upward, a large amount of cooling water can be supplied at once to the condenser. When an emergency situation occurs attributable to leakage of cooling water, a large amount of cooling water can be rapidly supplied to the condenser, whereby the stable operation and steady power generation of the thermoelectric power plant can be maintained.

The guide bar 3100 includes a stop protrusion which is increased in diameter from the upper portion of the guide bar 3100 around which the O-ring 3001 is provided. When the movable body 3200 is moved upward to the stop protrusion, the movable body 3200 is directly bumped into the O-ring 3001. Therefore, even if an impact is applied to the movable body 3200, damage or deformation thereof can be minimized. For reference, although the O-ring 3001 is formed of rubber in the present embodiment, other materials may be used, or the structure thereof may be modified without being limited to that shown in the drawings.

The movable body 3200 includes a first movable body 3210 which is configured to be movable upward along the guide bar 3100 and has a disk shape with a predetermined diameter, and a second movable body 3220 which is concentric with the first movable body 3210 and is provided around the circumferential outer surface of the support housing 102.

The connector 3400 includes a reduced-diameter part 3400a such that the connector 3400 can be broken when a load is increased to a predetermined level by debris deposited on the screen unit 2000. The connector 3400 is inserted, from the outside of the first movable body 3200 toward the guide bar 3100, into an insert hole 3002 formed in the first movable body 3200.

The reduced-diameter part 3400a may be formed in a medial portion or a rear end of the connector 3400 with respect to the longitudinal direction of the connector 3400, but it is not limited to a special position.

In the present embodiment, the connector 3400 has a pin shape with a predetermined length, but it may be modified to have another shape. That is, the connector 3400 can be changed into various forms rather than being limited to that shown in the drawings.

A bypass unit according to yet another embodiment of the present disclosure will be described with reference to the associated drawing.

Figure 12:
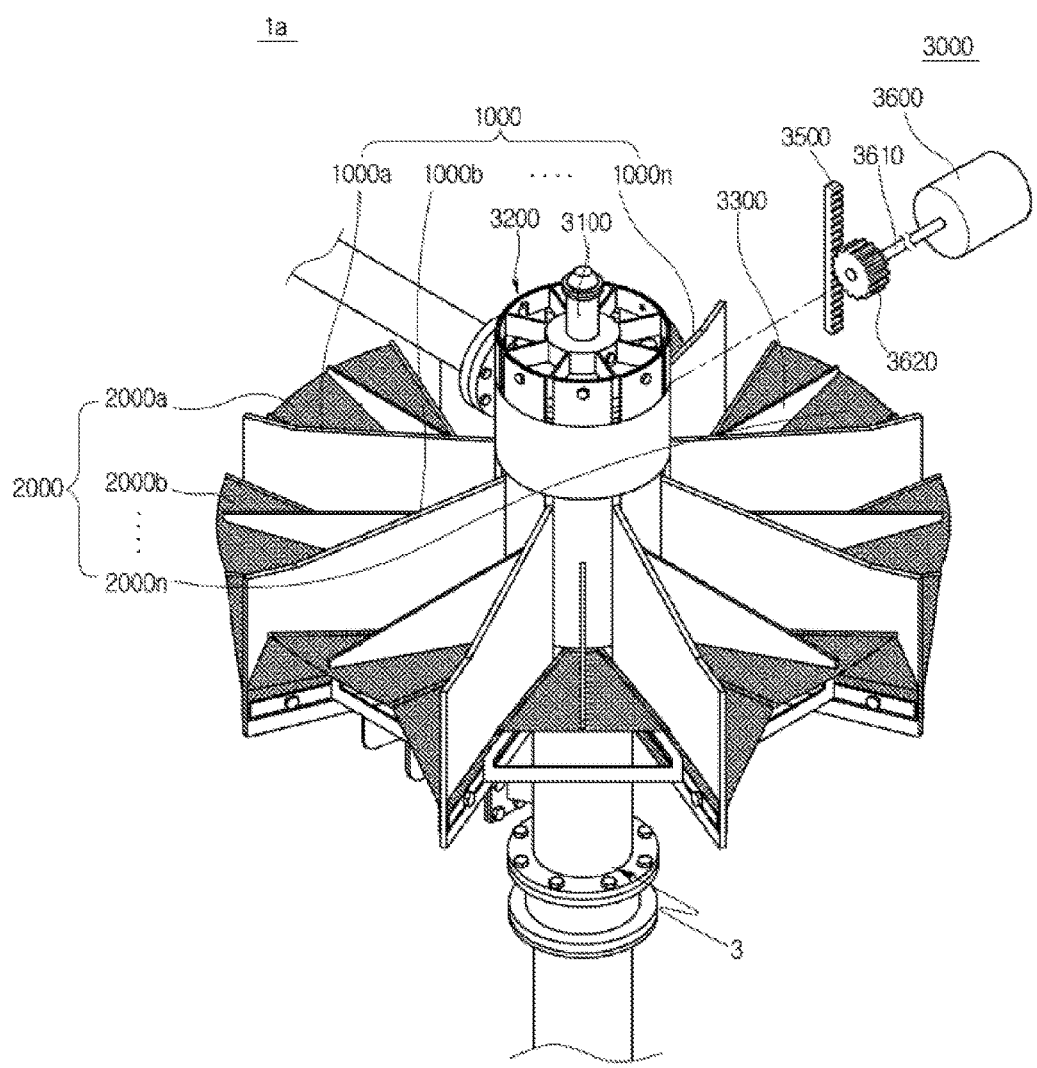
FIG. 12 is a perspective view illustrating a bypass unit according to still another exemplary embodiment.

Referring to FIG. 12, in the bypass unit 3000 according to the present embodiment, the configurations of the guide bar 3100, the movable body 3200 and the connection plate 3300 are the same as those of the bypass unit according to the preceding embodiment. However, the bypass unit 3000 according to the present embodiment is configured such that the entirety of the bypass unit 3000 is moved upward by a motor unit 3600, rather than having a breaking type structure using the connector 3400.

For this, in the present embodiment, a rotational force transmission part 3500 is installed on the outer surface of the movable body 3200 so as to receive rotational force from the motor unit 3600 and move the movable body 3200. The rotational force transmission part 3500 is able to employ any one of various power transmission structures and is not limited to the structure illustrated in the present embodiment.

The rotational force transmission part 3500 according to the present embodiment includes a rack which is longitudinally installed on the movable body 3200 so as to receive rotational force of a pinion 3620 coupled to a front end of a rotating shaft 3610 extending from the motor unit 3600. The rack is fixed to the movable body 3200. Thus, when the rotating shaft 3610 is rotated in a clockwise or counterclockwise direction, the entirety of the bypass unit 3000 is moved upward.

After the bypass operation has been completed, when the rotating shaft 3610 is rotated in the direction opposite to the direction in which it has been rotated to move the movable body 3200 upward, the movable body 3200 is returned to its original position. Therefore, the bypass unit 3000 can be easily operated without interrupting the operation of the debris filtration device.

A differential pressure sensor (20, refer to FIG. 9) is further installed in the chamber housing 2 to measure pressures of cooling water before and after passing through the screen unit 2000. The differential pressure sensor 20 is configured to transmit a sensing signal to the control unit 400.

The control unit 400 operates the motor unit 3600 in the normal or reverse direction, as described above, thus controlling the operation of the bypass unit 3000. In various embodiments of the present disclosure, when a large amount of debris is deposited on the screen unit, cooling water is forcibly supplied to a target structure, required to be cooled, by either a manual or automatic method using a bypass unit, thus promoting the stable operation of the target structure, thereby making it possible to stably manage a thermoelectric power plant or a nuclear power plant including the target structure.

Furthermore, according to the embodiments of the present disclosure, the efficiency of filtering out debris from cooling water passing through the screen unit can be enhanced, whereby the amount of unnecessary debris deposited in the target structure can be minimized. Therefore, the efficiency of the operation of the target structure can be improved.

While the present disclosure has been described with respect to the specific embodiments, it will be apparent to those skilled in the art that various changes and modifications may be made without departing from the spirit and scope of the invention as defined in the following claims.

What is claimed is:

1. A debris filtration apparatus comprising:
    a support unit including first to n-th unit supports arranged, to form a radial shape, in a circumferential direction around a support housing disposed on an upper portion of a rotor unit, the rotor unit being configured to rotate at a predetermined speed in a chamber housing;
    a screen unit including first to n-th unit screens disposed between adjacent ones of the first to n-th unit supports and configured to filter out debris from cooling water; and
    a bypass unit configured, when a load applied to the screen unit is increased to a predetermined level by debris deposited on the screen unit, to selectively rotate each of the first to n-th unit screens relative to the support unit and allow the cooling water to flow.

2. The debris filtration apparatus according to claim 1, wherein the bypass unit includes:
    a hinge that rotatably couples a first end of each of the first to n-th unit screens to the support housing; and
    a connector that connects a second end of each of the first to n-th unit screens to the chamber housing,
    wherein, the connector is configured to break when a load is increased to the predetermined level by debris deposited on the screen unit.

3. The debris filtration apparatus according to claim 2, wherein the connector extends from an outside of the chamber housing toward the corresponding one of the first to n-th unit screens.

4. The debris filtration apparatus according to claim 2, wherein the connector comprises:
    a reduced-diameter part formed such that a diameter thereof is reduced from opposite ends thereof to a medial portion with respect to a longitudinal direction of the connector.

5. The debris filtration apparatus according to claim 2, wherein the first to n-th unit screens are oriented in a horizontal direction between the adjacent ones of the first to n-th unit supports, and each of the first to n-th unit screens has an outer end that faces the chamber housing and is rotatable around the corresponding hinge toward the support housing.

6. The debris filtration apparatus according to claim 1, wherein the bypass unit comprises:
   first to n-th unit cylinders disposed outside the chamber housing toward the respective first to n-th unit screens; and
   first to n-th unit pistons configured to move in a first direction from the respective first to n-th unit cylinders toward corresponding insert holes formed in the first to n-th unit screens or move in a second direction away from the insert holes.

7. The debris filtration apparatus according to claim 1, wherein the bypass unit comprises:
   a rotating shaft connected at one end thereof to a frame provided on the first to n-th unit screens; and
   a motor unit configured to selectively rotate the rotating shaft.

8. The debris filtration apparatus according to claim 7, wherein the motor unit is configured to rotate the rotating shaft connected to at least one or multiple ones of the first to n-th unit screens.

9. The debris filtration apparatus according to claim 1, further comprising:
   a differential pressure sensor installed in the chamber housing and configured to measure a pressure of the cooling water that passes through the screen unit.

10. The debris filtration apparatus according to claim 9, wherein the differential pressure sensor comprises:
    a first sensor disposed below the screen unit and configured to measure a pressure of the cooling water that is in a state before passing through the screen unit; and
    a second sensor disposed over the screen unit and configured to measure a pressure of the cooling water that has passed through the screen unit.

11. The debris filtration apparatus according to claim 9, wherein the differential pressure sensor comprises a plurality of differential pressure sensors disposed in the chamber housing at positions spaced apart from each other at regular intervals in a circumferential direction.

12. The debris filtration apparatus according to claim 1, wherein each of the first to n-th unit screens protrudes in a polygonal shape upward between the adjacent ones of the first to n-th unit supports.

13. The debris filtration apparatus according to claim 1, wherein each of the first to n-th unit screens comprises:
    a protrusion part protruding from a central portion of an upper surface of the unit screen between the adjacent ones of the first to n-th unit supports; and
    an extension part extending in a dome shape downward from each of left and right lower edges of the protrusion part.

14. The debris filtration apparatus according to claim 1, wherein the first to n-th unit screens are formed in a dome shape from a circumference defined by outer ends of the first to n-th unit supports toward the support housing.

15. A debris filtration apparatus comprising:
    a support unit including first to n-th unit supports arranged, to form a radial shape, in a circumferential direction around a support housing disposed on an upper portion of a rotor unit, the rotor unit being configured to rotate at a predetermined speed in a chamber housing;
    a screen unit including first to n-th unit screens disposed between adjacent ones of the first to n-th unit supports and configured to filter out debris from cooling water; and
    a bypass unit configured, when a load applied to the screen unit is increased to a predetermined level by debris deposited on the screen unit, to separately move each of the first to n-th unit screens toward an upper portion of the support housing and form a space for allowing the cooling water to flow therethrough.

16. The debris filtration apparatus according to claim 15, wherein the bypass unit comprises:
    a guide bar extending upward from the support housing, with an O-ring fitted over the guide bar;
    a cylindrical movable body provided around the guide bar;
    a connection plate having a first end fixed to the cylindrical movable body, and a second end divided toward the respective first to n-th unit screens and connected to the first to n-th unit screens; and
    a connector inserted into the cylindrical movable body from an outside of the cylindrical movable body toward the guide bar and configured to be broken when a load applied to the screen unit is increased to the predetermined level by debris deposited on the screen unit.

17. The debris filtration apparatus according to claim 16, wherein the connector comprises:
    a reduced-diameter part formed such that a diameter thereof is reduced from opposite ends thereof to a medial portion with respect to a longitudinal direction of the connector.

18. The debris filtration apparatus according to claim 16, wherein the bypass unit comprises:
    a guide bar extending upward from the support housing, with an O-ring fitted over the guide bar;
    a cylindrical movable body provided around the guide bar;
    a unit connection plate having a first end fixed to the cylindrical movable body, and a second end divided toward the respective first to n-th unit screens and connected to the first to n-th unit screens; and
    a motor unit configured to transmit a rotational force to a rotational force transmission part fixed on an outer surface of the cylindrical movable body and selectively move the cylindrical movable body upward or downward.

19. The debris filtration apparatus according to claim 16, further comprising:
    a differential pressure sensor installed in the chamber housing and configured to measure pressures of the cooling water before passing through the screen unit and after having passing through the screen unit.

* * * * *